Nov. 17, 1931.  J. R. HAMILTON  1,831,954
PRESSURE SUPPLY SYSTEM FOR PIPES
Filed Nov. 21, 1928   2 Sheets—Sheet 1
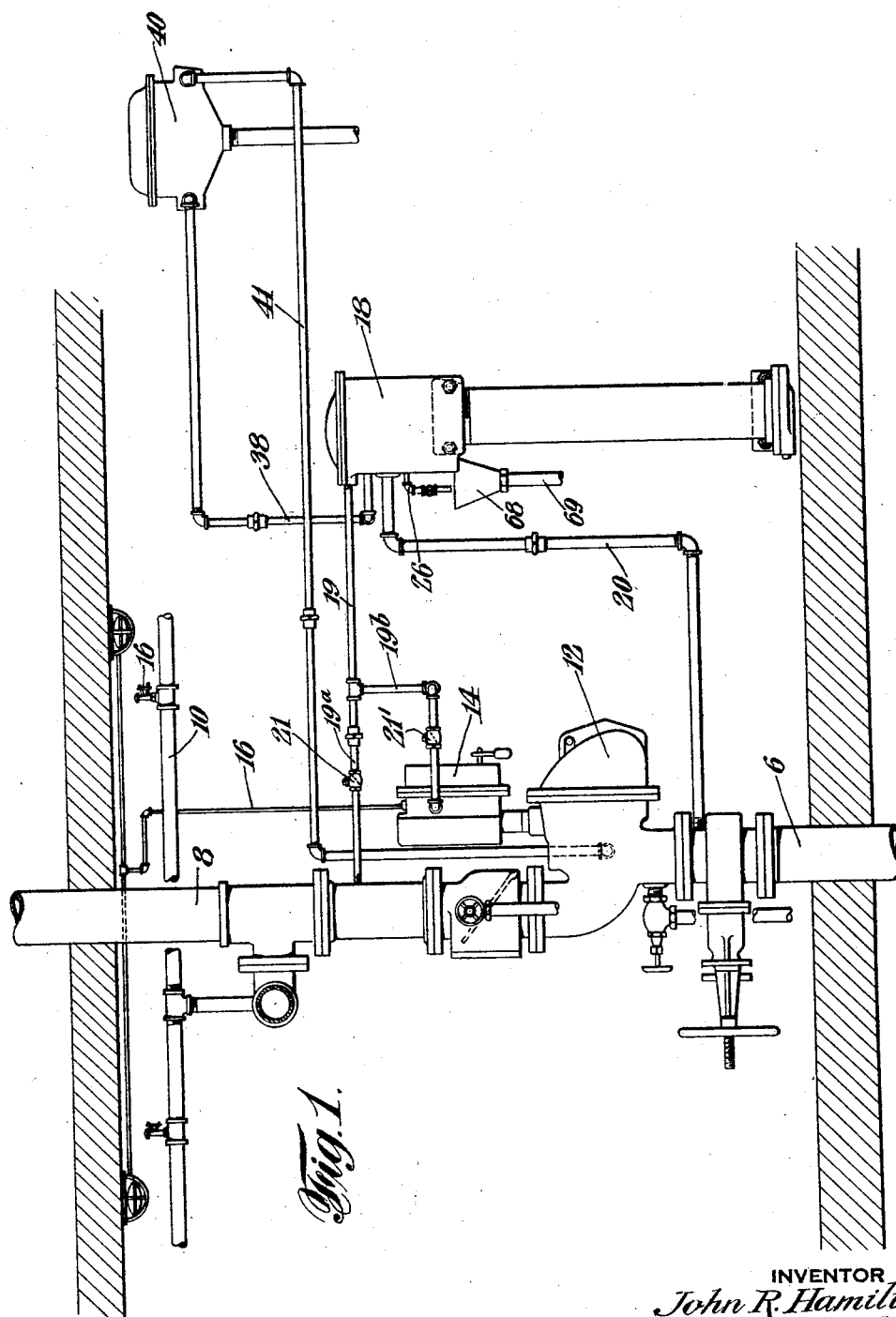
INVENTOR
John R. Hamilton
BY
Townsend & Decker
ATTORNEYS Nov. 17, 1931.  J. R. HAMILTON  1,831,954
PRESSURE SUPPLY SYSTEM FOR PIPES
Filed Nov. 21, 1928  2 Sheets-Sheet 2
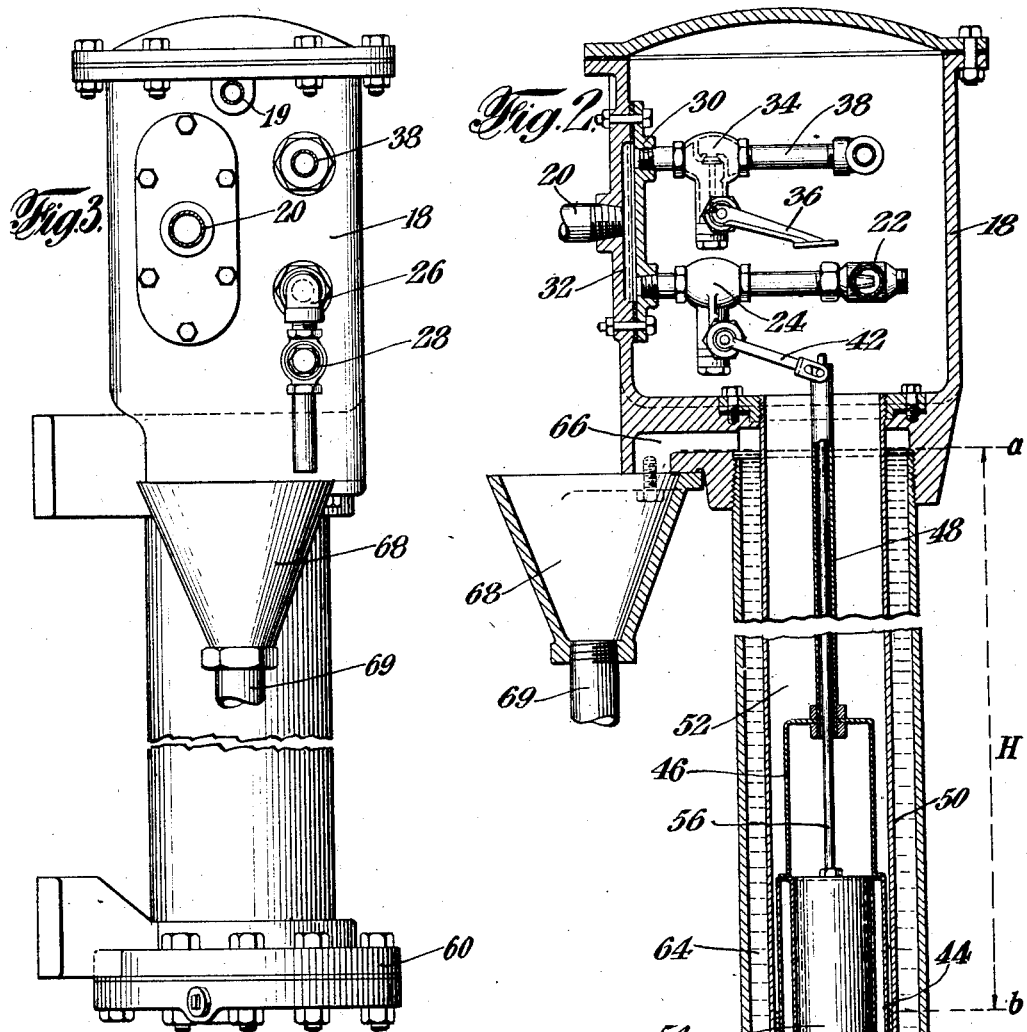
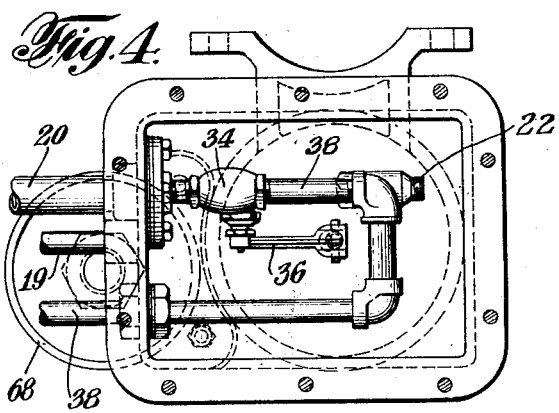
INVENTOR
John R. Hamilton
BY
Townsend + Decker
ATTORNEYS.

Patented Nov. 17, 1931

1,831,954

UNITED STATES PATENT OFFICE

JOHN R. HAMILTON, OF CLEVELAND HEIGHTS, OHIO, ASSIGNOR TO AUTOMATIC SPRINKLER COMPANY, OF AMERICA, OF CLEVELAND, OHIO, A CORPORATION OF DELAWARE

PRESSURE SUPPLY SYSTEM FOR PIPES

Application filed November 21, 1928. Serial No. 320,859.

This invention relates to an automatic air injector for producing and maintaining a predetermined pressure condition in pipes of a fire extinguishing or fire alarm system.

It is a primary object of the invention to provide an apparatus which will operate uniformly to maintain the intended pressure.

It is a further object to simplify and condense the mechanism for maintaining the pressure so as to permit the intended pressure to be accurately maintained.

It is a further object to provide an apparatus which will create an alarm either upon failure of the pressure replenishing devices to function at all or to function adequately so that, if for any reason the pressure falls below the predetermined amount, such alarm will be given.

These and other objects will appear more fully from the following description when considered in connection with the drawings in which:

Fig. 1 illustrates generally one known form of fire extinguishing system showing my invention applied thereto.

Fig. 2 is an enlarged sectional view of the air injector apparatus.

Fig. 3 is an elevational view of the apparatus shown in Fig. 2 taken at right angles thereto.

Fig. 4 is a plan view of the apparatus shown in Fig. 2 with the cover plate removed.

The fire extinguishing system to which I have shown my invention as applied includes a main fluid supply pipe 6 and distributing pipes 8 and 10 leading to the various protected areas. The supply of fluid from the pipe 6 to the distributing pipes is controlled by a main valve 12 automatically actuated on an increase of pressure in the control box 14 so that, upon the occurrence of a fire condition in any portion of the protected area the rise in temperature in such area creates an impulse or other pressure reaction in the control box 14 and turns on the main valve 12. The branch distributing lines 10 may be provided with normally closed sprinkler heads 16 which are caused to be actuated and opened by a predetermined increase in temperature as will be understood.

The valve 12 closes communication between the supply pipe 6 and the branch and distributing pipes 8 and 10 so that normally the pipes 8 and 10 are maintained dry. The system of control tubing 16 leading to the various fire areas and effective to operate the valve 12 through the instrumentality of control box 14 are normally closed to the atmosphere and are, of course, normally dry.

The above described devices are of known types.

My present invention relates to apparatus for maintaining a predetermined pressure condition within the tubing 16 and fluid supply pipes 8 and 10 so as to permit the detection of any leak or other condition in such tubing or supply pipes which might cause the apparatus to fail to function in case of occurrence of a fire.

The apparatus provided for accomplishing this purpose includes a main pressure casing 18 connecting with the distributing pipes 8 and 10 by means of the tubes 19 and 19a and with the control box 14 and control tubing 16 by means of the pipe 19b. It is preferred to place one-way valves as indicated at 21, 21' between the pipes 19a and 19b and the fluid supply pipes and control tubing 16 so as to prevent back pressure or liquid within these pipes from passing into the control box 14 and to prevent sudden increases in the pressure in the pipes or tubing from influencing the pressure condition in the pressure chamber 18.

Water pressure for actuating the air injector apparatus is conducted to the pressure chamber 18 through the supply pipe 20 connecting with the water main 6 preferably outwardly of the control valve 12 so as to have water pressure available at any time the apparatus is intended to function.

The air introducing apparatus is shown as a Venturi inspirator 22 operated by a flow of water and controlled by the valve 24. The air supplied with the liquid passing through the inspirator 22 enters through the air inlet tube 26 provided with a one-way valve at 28 to prevent the escape of pressure from the chamber 18 into the outside air after the inspirator has ceased to operate. Communication is provided between the supply pipe 20 and the inspirator 22 by means of the plate 30 providing a passage 32 between this plate and the main body of the casing 18.

A second valve 34 is provided for the purpose of actuating an alarm under the conditions referred to more particularly below. The valve 34 is controlled by the valve lever 36 whereby, upon this lever being raised, flow of water is permitted from the pipe 20 through the valve 34, through the pipe 38, to the double water motor alarm 40. The alarm 40 is also intended, if desired, to be actuated by the water pressure in the main fluid distributing pipes at any time that the valve 12 has been actuated to admit fire extinguishing fluid, the actuating fluid being supplied through the supply pipe 41 as shown.

The valve 24 for the air inspirator is controlled by the valve lever 42 operating to open the valve upon the raising of the lever 42. The lever 42 is controlled in its vertical position by means of the hollow cylindrical float 44 connected by means of the shell 46 and tubular rod 48 to the valve lever 42.

The float 44 is positioned within an inner casing 50 which casing forms a float chamber 52 wherein water and air may separate by gravity. The cylindrical casing 50 is supported at its upper end in sealed relation upon the casing 18 in any desired manner as by means of the screw-threaded connection shown and communicates directly with the interior of this casing.

The valve lever 36 is positioned to be actuated by an inner float 54 positioned within the float 44 and shell 46 and carrying an actuating rod 56 slidable through the hollow rod 48 and projectible beyond the same upon an abnormal rise of the water level in the float chamber, to actuate the valve lever 36 as will appear more fully below.

The inner casing 50 rests upon a support 58, mounted upon a spring saddle 59 which in turn is supported upon the lower closure casting 60 carried by the outer casing 62. The space between the upright casings 50 and 62 constitutes a liquid chamber 64 which provides the head of pressure required within the system. The chamber 64 has an overflow outlet 66 which discharges into a suitable overflow sink 68 and discharge pipe 69.

The float 44 is normally maintained at substantially the height shown in Fig. 2 wherein the water level in the float chamber is at the point marked $b$. Since the overflow from the chamber 64 is at the elevation marked $a$ the head of pressure is the difference between the height $a$ and the height $b$ indicated by the vertical line H. The float 54 normally moves upwardly and downwardly with the float 44 but is capable of moving upwardly independently of the float 44 under abnormal conditions as will appear more fully below.

The operation of the apparatus will be clearly understood from the above description. The water level in the chamber 64 is normally at about the point $a$ and the water level in the chamber 52 at the level $b$, the head of liquid H producing the required pressure within the casing 18 and the distributing system of pipes and control tubing of the system. Upon any leak or other condition occurring which results in a decrease of the pressure in the system of control tubing or distributing pipes and the casing 18 the liquid in the chamber 64 passes into the chamber 52 and raises floats 44 and 54, the former of which actuates valve 24. This results in the injection of a spray of water and air into the casing 18 and chamber 52. The air and water separate by gravity, the water passing down into the chamber 52, being forced into chamber 64 and through overflow outlet 66 due to the increasing pressure in the system, until the floats 44 and 54 again resume substantially the positions shown in Fig. 2. The use of water as the actuating power for introducing air into the system assures an adequate supply for the liquid seal in the chambers 52 and 64 since each time the air pressure is replenished the liquid forming the pressure head is also replenished.

If for any reason the supply of liquid is unable to replenish the air fast enough to accommodate any leak which has occurred in any of the pipes or on failure of the inspirator to operate due to any cause then the water level would continue to rise in the chamber 52 and the float 54 would pass upwardly into the shell 46 to such an extent as to cause rod 56 to actuate the lever 36 and turn on the power for actuating the alarm 40. This would permit the attendant to correct the defect or leak in the fire extinguishing or control system so that further operation of the air inspirator would operate to displace the water in the chamber 52 and cause the floats 54 and 44 to assume their normal positions.

Due to the arrangement of the floats 44 and 54 side by side within the chamber 52 and to the substantial movement of these floats it is possible to position the parts accurately so as to maintain exactly the head of pressure intended for the system.

It will be understood that where the apparatus is to be used in an unheated building the pressure supply apparatus will be suitably located or protected to prevent freezing of the liquid.

What I claim as my invention is:

1. In combination with fluid conducting pipes, means for maintaining a predetermined pressure condition different from atmospheric pressure therein and comprising a liquid actuated air injector, a liquid trap constructed to close communication between said pipes and the outside air and including a control chamber for receiving the air and liquid discharged from said air injector, said chamber having a variable liquid level therein dependent on the pressure in said system and means directly governed by the height of liquid in said chamber for controlling said air injector.

2. In a fire extinguishing system, fluid conducting pipes, means for maintaining a predetermined pressure condition different from atmospheric pressure therein comprising a liquid trap including a float chamber, a fluid actuated air injector for discharging fluid and air into said chamber, a float in said chamber and means responsive to the position of said float for controlling said air injector.

3. In a fire extinguishing system, fluid conducting pipes, means for maintaining a predetermined pressure condition different from atmospheric pressure therein, a liquid trap including a float chamber having a variable liquid level therein dependent on the pressure in said system, means directly governed by the height of liquid in said chamber for controlling said maintaining means and an alarm operated directly by a predetermined change in the liquid level in said chamber.

4. In a fire extinguishing system, fluid conducting pipes, means for maintaining a predetermined pressure condition different from atmospheric pressure therein comprising an injector of air and liquid, a separating chamber normally containing a supply of liquid and air and communicating with said injector for receiving said air and liquid, a vertically arranged liquid chamber communicating with said separating chamber adjacent the lower portion of the latter and with the outside air on a level above the point of communication with said separating chamber, and means controlled by a drop in pressure in said separating chamber for operating said injector.

5. In a fire extinguishing system, fluid conducting pipes, means for maintaining a predetermined pressure condition different from atmospheric pressure therein comprising an air injector, a float chamber normally containing a supply of liquid and communicating with said air injector, a vertically arranged liquid chamber communicating with said float chamber adjacent the lower portion of the latter and with the outside air on a level above the point of communication with said float chamber, a float in said float chamber, means operatively connecting said float with said air injector, a second float in said float chamber, an alarm, and means for operating said alarm on a predetermined change of position of said second float.

6. In a fire extinguishing system, fluid conducting pipes, means for maintaining a predetermined pressure condition different from atmospheric pressure therein comprising a liquid actuated air injector, a float chamber normally containing a supply of liquid and communicating with said air injector for receiving the liquid and air discharged therefrom, a vertically arranged liquid chamber communicating with said float chamber adjacent the lower portion of the latter and with the outside air on a level above the point of communication with said float chamber, a float in said float chamber, and means for associating said float and said air injector whereby a predetermined rise or fall of the former will cause the latter to operate or to be rendered inoperative respectively.

7. In a fire extinguishing system, fluid conducting pipes, means for maintaining a predetermined pressure condition different from atmospheric pressure therein comprising an air injector, a float chamber normally containing a supply of liquid and communicating with said air injector, a vertically arranged liquid chamber communicating with said float chamber adjacent the lower portion of the latter and with the outside air on a level above the point of communication with said float chamber, a float in said float chamber, means for associating said float and said air injector whereby a predetermined rise or fall of the former will cause the latter to operate or to be rendered inoperative respectively, an alarm, and a second float in said float chamber operatively associated with said alarm, said second float being inoperative for the normal rise or fall of liquid in said float chamber but operative to operate said alarm on any abnormal rise of liquid in said float chamber.

8. In combination with a fire extinguishing system, means for maintaining predetermined air pressure therein comprising a chamber wherein air and water separate by gravity and a liquid chamber communicating with a lower portion of said first-named chamber and open to the atmosphere at a point above the point of communication thereof with said first-named chamber, a liquid actuated air inspirator for introducing air and liquid into said first-named chamber, and means governed by the height of liquid in said first-named chamber for controlling said inspirator.

9. In combination with a fire extinguishing system, means for maintaining predetermined air pressure therein comprising a chamber wherein air and water separate by gravity and a liquid chamber communicating with a lower portion of said first-named chamber and open to the atmosphere at a point above the point of communication thereof with said first-named chamber, a liquid actuated air inspirator for introducing air and liquid into said first-named chamber, an alarm, a plurality of floats in said first-named chamber and means controlled by the positions of each of said floats for actuating said inspirator and alarm respectively, said alarm actuating means including a lost motion connection.

10. In combination with a fire extinguishing system, means for maintaining predetermined air pressure therein comprising a chamber wherein air and water separate by gravity and a liquid chamber communicating with a lower portion of said first-named chamber and open to the atmosphere at a point above the point of communication thereof with said first-named chamber, a liquid actuated air inspirator for introducing air and liquid into said first-named chamber, an alarm, a plurality of floats in said first-named chamber and means controlled by the positions of each of said floats for actuating said inspirator and alarm respectively, said floats being arranged in guiding relation to one another.

11. In combination with a system of tubular fluid conductors, means for maintaining a predetermined pressure condition therein, said means including a chamber, a liquid actuated air injector for injecting liquid and air into said chamber, said chamber including a portion wherein air and liquid separate by gravity and means responsive to the head of liquid in said chamber for controlling said injector.

12. In combination with a fire extinguishing system including conducting pipes for conveying fire extinguishing fluid to a fire area and controlling tubing, means for maintaining a predetermined pressure condition in said pipes and tubing, said means including a chamber, a liquid actuated air injector for injecting liquid and air into said chamber, said chamber including a portion wherein air and liquid separate by gravity and means responsive to the head of liquid in said chamber for controlling said injector.

13. In combination with a system of tubular fluid conductors, means for maintaining a predetermined pressure condition therein, said means including a chamber, a liquid actuated air injector for injecting liquid and air into said chamber, said chamber including a portion wherein air and liquid separate by gravity, means for utilizing the air injecting liquid for providing a head of liquid pressure in said chamber, and means directly responsive to the height of liquid in the air and liquid separating portion of said chamber for controlling said injector.

Signed at Cleveland, in the county of Cuyahoga and State of Ohio, this 15th day of November A. D. 1928.

JOHN R. HAMILTON.